United States Patent
Guo et al.

(10) Patent No.: US 11,584,192 B2
(45) Date of Patent: Feb. 21, 2023

(54) DEFROSTING CONTROL DEVICE, AIR CONDITIONER AND DEFROSTING CONTROL METHOD THEREFOR

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Aibin Guo, Zhuhai (CN); Huili Wu, Zhuhai (CN); Zhe Wang, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 239 days.

(21) Appl. No.: 16/642,753

(22) PCT Filed: Aug. 17, 2018

(86) PCT No.: PCT/CN2018/100947
§ 371 (c)(1),
(2) Date: Feb. 27, 2020

(87) PCT Pub. No.: WO2019/091175
PCT Pub. Date: May 16, 2019

(65) Prior Publication Data
US 2021/0078384 A1    Mar. 18, 2021

(30) Foreign Application Priority Data
Nov. 8, 2017   (CN) .......................... 201711092599.6

(51) Int. Cl.
*F24F 13/08*     (2006.01)
*F24F 13/10*     (2006.01)
(Continued)

(52) U.S. Cl.
CPC ..... *B60H 1/00821* (2013.01); *B60H 1/00328* (2013.01); *B60H 1/00428* (2013.01);
(Continued)

(58) Field of Classification Search
CPC .......... F24F 7/013; F24F 13/08; F24F 13/082; F24F 13/084; F24F 13/105; F24F 13/10;
(Continued)

(56) References Cited

U.S. PATENT DOCUMENTS

| | | | | |
|---|---|---|---|---|
| 1,931,356 A | * | 10/1933 | Porter ....................... | F01P 7/12 92/92 |
| 3,011,518 A | * | 12/1961 | Day ........................ | F24F 13/10 251/212 |

(Continued)

FOREIGN PATENT DOCUMENTS

| | | |
|---|---|---|
| CN | 104121724 A | 10/2014 |
| CN | 104648081 A | 5/2015 |

(Continued)

OTHER PUBLICATIONS

International Search Report of PCT/CN2018/100947.
Written Opinion of PCT/CN2018/100947.

*Primary Examiner* — Frantz F Jules
*Assistant Examiner* — Jason N Thompson
(74) *Attorney, Agent, or Firm* — Dragon Sun Law Firm, PC; Jinggao Li; Nathaniel Perkins

(57) ABSTRACT

Provided are a defrosting control device, an air conditioner and a defrosting control method therefor. The device includes an airbag device, wherein the airbag device includes a mounting support (1), an airbag (2) and an inflation mechanism. When an air conditioner to be controlled enters a defrosting mode, the inflation mechanism inflates the airbag (2) such that same forms an airbag layer to isolate an outdoor heat exchanger of the air conditioner to (Continued)

be controlled from flowing air outside the outdoor heat exchanger. The defrosting control device can achieve the beneficial effects of a small defrosting heat loss, a good defrosting effect and a good user experience.

19 Claims, 5 Drawing Sheets

(51) Int. Cl.
*F24F 13/14* (2006.01)
*B60H 1/00* (2006.01)
*F24F 11/43* (2018.01)

(52) U.S. Cl.
CPC ..... *B60H 1/00785* (2013.01); *B60H 1/00899* (2013.01); *F24F 11/43* (2018.01)

(58) Field of Classification Search
CPC ......... F24F 2013/087; F24F 2013/1466; F28F 19/006; B60H 2021/00961; F25B 47/006; F25B 47/02; F25B 47/022
USPC ..................................................... 165/98, 99
See application file for complete search history.

(56) References Cited

U.S. PATENT DOCUMENTS

| | | | | |
|---|---|---|---|---|
| 4,124,066 A | * | 11/1978 | Taylor | F01P 7/10 123/41.58 |
| 5,016,856 A | * | 5/1991 | Tartaglino | F24F 13/1426 137/907 |
| 5,348,270 A | * | 9/1994 | Dinh | F24F 13/10 137/553 |
| 5,701,752 A | | 12/1997 | Tsunokawa et al. | |
| 5,916,931 A | * | 6/1999 | Adams | B29C 73/163 524/565 |
| 6,189,608 B1 | * | 2/2001 | Bodas | B60K 11/085 165/300 |
| 2003/0019232 A1 | * | 1/2003 | Matsuo | B60L 1/003 62/324.1 |
| 2004/0253919 A1 | * | 12/2004 | Dube | A01K 1/0064 454/274 |
| 2008/0254735 A1 | * | 10/2008 | Coward | F24F 13/10 454/358 |

FOREIGN PATENT DOCUMENTS

| | | |
|---|---|---|
| CN | 108146185 A | 6/2018 |
| CN | 207565268 U | 7/2018 |
| JP | 08216655 A | 8/1996 |

* cited by examiner

DEFROSTING CONTROL DEVICE, AIR CONDITIONER AND DEFROSTING CONTROL METHOD THEREFOR

CROSS-REFERENCE TO RELATED APPLICATIONS

This application is a national stage application of PCT Application No. PCT/CN2018/100947. This application claims priority from PCT Application No. PCT/CN2018/100947, filed Aug. 17, 2018, and CN Application No. 201711092599.6, filed Nov. 8, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure belongs to the technical field of air conditioners, and especially relates to a defrosting control device, an air conditioner and a defrosting control method therefor, in particular to an airbag device for defrosting a heat-pump automobile air conditioners, a heat-pump automobile air conditioners with this device, and a control method for the heat-pump automobile air conditioners.

BACKGROUND ART

As one of clean and environmentally friendly technologies using renewable resources, heat-pump air conditioners use solar energy resources stored in the surface soil and water as cold and heat sources and are free of combustion, smoke, waste and pollution. With regard to a conventional household heat-pump air conditioner, when the machine set operates in a heating mode for a long period of time in a low-temperature and humid environment, an outdoor heat exchanger is easily frosted, thereby influencing the heat exchange performance and reducing the heating effect of the air conditioner. In this case, it is necessary to switch it to a defrosting mode in which air exhausted by an air compressor directly enters the outdoor heat exchanger for defrosting. During the defrosting process, the external fan stops operating.

With the development of pure electric automobiles, heat-pump air conditioners have been gradually applied to pure electric automobiles at present. Since the outdoor heat exchanger of the automobile air conditioner is located in the front of the automobile, a high air flow rate will be generated on the surface of the outdoor heat exchanger when the automobile is running. When the heat-pump automobile air conditioner enters the defrosting mode, air flowing at a high rate on the surface of the outdoor heat exchanger will take away a large amount of heat used for defrosting, resulting in the waste of heat in the heat-pump air conditioner system. Moreover, the defrosting effect of the heat-pump automobile air conditioner will be seriously affected, or even the defrosting cannot be achieved, thereby affecting the comfort of passengers in the automobile. This is obviously different from the household air conditioners, and is also a great challenge for the industry of heat-pump automobile air conditioners.

There are defects such as high defrosting heat loss, poor defrosting effect and poor user experience in the prior art.

Therefore, a heretofore unaddressed need exists in the art to address the aforementioned deficiencies and inadequacies.

SUMMARY OF THE INVENTION

In view of the above defects, an objective of the present disclosure is to provide a defrosting control device, an air conditioner and a defrosting control method therefor, to solve the problem of high defrosting heat loss, which is caused by the air flowing at a high rate on the surface of an outdoor heat exchanger of a heat-pump automobile air conditioner will take away a large amount of heat used for defrosting in the prior art, so as to achieve the effect of reducing the defrosting heat loss.

The present disclosure provides a defrosting control device, including an airbag device which is configured to, when an air conditioner to be controlled enters a defrosting mode, form an airbag layer to isolate an outdoor heat exchanger of the air conditioner to be controlled from flowing air outside the outdoor heat exchanger.

Optionally, the airbag device is further configured to cancel the airbag layer when the air conditioner to be controlled does not enter the defrosting mode or exits the defrosting mode, wherein the air conditioner to be controlled includes a heat-pump automobile air conditioner; and/or when the air conditioner to be controlled includes a heat-pump automobile air conditioner, the flowing air outside the outdoor heat exchanger includes flowing air in the front of an automobile on which the heat-pump automobile air conditioner is mounted; and/or when the air conditioner to be controlled includes a heat-pump automobile air conditioner, the airbag device is arranged in the front of the automobile on which the heat-pump automobile air conditioner is mounted.

Optionally, the airbag device includes an airbag and an inflation mechanism, wherein the airbag is arranged outside the outdoor heat exchanger; wherein the airbag is arranged in an air-inlet grille in the front of the automobile on which the heat-pump automobile air conditioner is mounted, when the air conditioner to be controlled includes a heat-pump automobile air conditioner; the inflation mechanism is communicated with the airbag and configured to, when the air conditioner to be controlled enters the defrosting mode, inflate the airbag so that the airbag forms the airbag layer; or when the airbag device is further configured to cancel the airbag layer when the air conditioner to be controlled does not enter the defrosting mode or exits the defrosting mode, the inflation mechanism is further configured to: maintain the airbag in a non-inflated state or collapsed state so that the airbag cancels the airbag layer, when the air conditioner to be controlled does not enter the defrosting mode; and deflate the airbag so that the airbag cancels the airbag layer, when the air conditioner to be controlled exits the defrosting mode.

Optionally, the inflation mechanism includes an air pipe and an air pump, wherein an outlet end of the air pipe is communicated with an air inlet end of the airbag; an air exhaust end of the air pump is communicated with a first inlet end of the air pipe; and, the air pump is configured to: rotate in a set inflation direction to inflate the airbag, when the air conditioner to be controlled enters the defrosting mode; stop rotating to maintain the airbag in the non-inflated state or collapsed state, when the air conditioner to be controlled does not enter the defrosting mode; and rotate in a set deflation direction to take air away from the airbag so as to deflate the airbag, when the air conditioner to be controlled exits the defrosting mode.

Optionally, the inflation mechanism further includes a control valve; the control valve is mounted at a second inlet end of the air pipe and configured to control the second inlet end; when the air conditioner to be controlled enters the defrosting mode and the air pump rotates in the inflation direction, the second inlet end is closed, so that the air pump inflates the airbag in the case where the second inlet end is closed; when the air conditioner to be controlled does not enter the defrosting mode and the air pump does not rotate, the second inlet end is opened to maintain the airbag in the non-inflated state or collapsed state; and/or when the air conditioner to be controlled exits the defrosting mode and the air pump rotates in the deflation direction, the second inlet end is closed so that the air pump deflates the airbag; and, when the air conditioner to be controlled exits the defrosting mode and the air pump stops rotating, the second inlet end is opened to deflate the airbag through the second inlet end under the pressure of the outside flowing air.

Optionally, there is more than one airbag; and/or when there are more than two airbags, the outlet end of the air pipe includes more than two outlet branches, wherein the number of the outlet branches is matched with the number of the airbags, and each of the outlet branches is communicated with the air inlet end of each of the airbags; and/or a wall of the airbag includes an elastic layer made of an elastic material, wherein the elastic material includes natural latex; and/or the deflation direction includes a direction opposite to the inflation direction; and/or when the air conditioner to be controlled includes a heat-pump automobile air conditioner, the air pressure at the air exhaust end of the air pump is greater than the sum of the contraction force of the airbag itself and the wind pressure applied to the outer surface of the airbag when the automobile on which the heat-pump automobile air conditioner is mounted runs at a set maximum speed; and/or when the inflation mechanism further includes a control valve, an outlet of the control valve faces the tail or two sides of the automobile on which the heat-pump automobile air conditioner is mounted, when the air conditioner to be controlled includes a heat-pump automobile air conditioner; and/or the control valve includes an air exhaust valve, and the air exhaust valve includes at least one of a solenoid valve and a pneumatic valve, wherein the solenoid valve includes a normally-open solenoid valve.

Optionally, the wall of the airbag further includes at least one of a wear-resistant layer made of a wear-resistant material, a reinforcing layer made of a reinforcing material and an isolation layer made of an isolation material, wherein the wear-resistant layer is arranged on an outer periphery of the elastic layer; the reinforcing layer is arranged on an outer periphery of at least one of the elastic layer and the wear-resistant layer; the isolation layer is arranged on an inner periphery of the elastic layer; wherein the wear-resistant material includes vulcanized butadiene rubber; the reinforcing material includes at least one of nylon and glass fiber; and the isolation material includes an anti-adhesive material.

Optionally, the inflation device further includes a mounting support; the mounting support is mounted outside the outdoor heat exchanger and configured to mount the airbag, wherein when the air conditioner to be controlled includes a heat-pump automobile air conditioner, the mounting support is mounted in the front of the outdoor heat exchanger of the heat-pump automobile air conditioner.

Optionally, the mounting support includes positioning rods; there is a plurality of positioning rods; and, adjacent two of the plurality of positioning rods are respectively arranged at two ends of the airbag to position the airbag between the adjacent two of the plurality of positioning rods.

Optionally, the mounting support further includes a support rod; the airbag is arranged above and/or below the support rod, and/or sheathed on an outer periphery of the support rod; and, there is more than one support rod that is arranged between the adjacent two of the plurality of positioning rods to support and/or fix the airbag.

Optionally, the mounting support can be mounted in at least one of a horizontal direction, a vertical direction and an inclined direction, wherein when the mounting support is mounted in the horizontal direction, the positioning rod includes a first vertical rod, and the support rod includes a first horizontal rod; and when the mounting support is mounted in the vertical direction, the positioning rod includes a second horizontal rod, and the support rod includes a second vertical rod; and/or when the airbag is arranged above and/or below the support rod, the structure of the airbag includes an integral bag-like structure and/or a socketed bag-like structure that is adhered and/or hung to the support rod; and, when the airbag is sheathed on the outer periphery of the support rod, the structure of the airbag includes a socketed bag-like structure that is sheathed on the support rod through a middle through hole axially formed thereon; wherein when the air conditioner to be controlled includes a heat-pump automobile air conditioner and the airbag is arranged in an air-inlet grille in the front of the automobile on which the heat-pump automobile air conditioner is mounted, the shape of the middle through hole is matched with that of the air-inlet grille and can be adjusted according to the shape of the air-inlet grille; and/or the shape of the radial cross-section of the socketed bag-like structure includes at least one of a circular ring, a rectangular ring, and an arc-shaped ring with a set radian on its surface, wherein when the shape of the radial cross-section includes a circular ring, the airbag includes an annular airbag; and, when the shape of the radial cross-section includes a rectangular ring, the airbag includes a rectangular airbag.

In accordance with the device described above, another aspect of the present disclosure provides an air conditioner, including the defrosting control device described above.

In accordance with the air conditioner described above, still another aspect of the present disclosure provides a defrosting control method for an air conditioner, including a step of: by the airbag device, forming an airbag layer when an air conditioner to be controlled enters a defrosting mode, to isolate an outdoor heat exchanger of the air conditioner to be controlled from flowing air outside the outdoor heat exchanger.

Optionally, the method further includes a step of: by the airbag device, cancelling the airbag layer when the air conditioner to be controlled does not enter the defrosting mode or exits the defrosting mode.

Optionally, when the air conditioner includes a heat-pump automobile air conditioner and the heat-pump automobile air conditioner enters the defrosting mode, the step of forming an airbag layer when the air conditioner to be controlled enters the defrosting mode includes: closing an air exhaust valve of the heat-pump automobile air conditioner, and activating an air pump of the heat-pump automobile air conditioner to inflate an airbag of the heat-pump automobile air conditioner; and, after the airbag is inflated, forming an airbag layer on a mounting support of the heat-pump automobile air conditioner, so that an air flow in the front of an automobile on which the heat-pump automobile air conditioner is mounted is blocked by the airbag layer to diffuse around and the isolation of an outdoor heat exchanger of the heat-pump automobile air conditioner from the air flow in the front of the automobile is realized; or, the step of cancelling the airbag layer when the air conditioner to be controlled does not enter the defrosting mode or exits the defrosting mode includes: after defrosting completed by the heat-pump automobile air conditioner, controlling the air pump of the heat-pump automobile air conditioner to stop, maintaining the air exhaust valve of the heat-pump automobile air conditioner in an ON state while being powered off, communicating the interior of the airbag of the heat-pump automobile air conditioner with the atmosphere, and exhausting air in the airbag by a contraction force of the airbag itself and a wind pressure in the front of the automobile.

In the solutions of the present disclosure, by providing airbags, after the heat-pump automobile air conditioner enters the defrosting mode, the airbag device is inflated to isolate an outdoor heat exchanger from air flowing in the front of the automobile, that is, no air flows on the surface of the outdoor heat exchanger even when the automobile is running, so that no defrosting heat loss of the air conditioner system is caused and the energy is saved. Accordingly, the heat waste of the air conditioner system, which is caused because high-speed flowing air will take away a large amount of heat on the surface of the outdoor heat exchanger after the heat-pump automobile air conditioner enters the defrosting mode, is solved.

Further, in the solutions of the present disclosure, by isolating the outdoor heat exchanger from flowing air in the front of the automobile by the airbag, the defrosting of the heat-pump automobile air conditioner can be quickened, the defrosting effect can be enhanced, and the comfort of passengers in the automobile can be improved. Accordingly, the problem that the comfort of passengers in the automobile is seriously affected due to slow or even failed defrosting of the heat-pump automobile air conditioner is solved.

Further, in the solutions of the present disclosure, the defrosting of the heat-pump automobile air conditioner is quickened by the airbag, without requiring any motor and adjustable grille device, so the number of operating components is decreased, the structure becomes simple, the reliability is high and the cost is low. Accordingly, the problems of complicated structure and high cost of the adjustable air-inlet grille device driven by the motor, as well as low reliability which is caused because the moving parts are easily jammed and damaged, are solved.

Further, in the solutions of the present disclosure, when the airbag is not in use, air in the airbag will be exhausted. Since the airbag itself is elastic, the airbag will be closely fitted with the mounting support or the matched air-inlet grille, so that the air inlet volume of the outdoor heat exchanger during the normal operation will not be affected and no noise will be generated. Accordingly, the problem that the adjustable air-inlet grille device driven by the motor is likely to affect the air inlet volume of the outdoor heat exchanger due to inaccurate resetting and is possible to generate noise is solved.

Therefore, in the solutions of the present disclosure, by arranging the airbag in the front of the outdoor heat exchanger of the heat-pump automobile air conditioner, the outdoor heat exchanger is isolated from air flowing at a high rate in the front of the automobile by the inflated airbag during the defrosting process of the heat-pump automobile air conditioner, so that heat from the outdoor heat exchanger is prevented from being blown away during the defrosting process of the heat-pump automobile air conditioner. Accordingly, the problem of high defrosting heat loss in the prior art, which is caused because air flowing at a high rate on the surface of the outdoor heat exchanger of the heat-pump automobile air conditioner will take away a large amount of heat used for defrosting, is solved. Thus, the defects such as high defrosting heat loss, poor defrosting effect and poor user experience in the prior art are overcome, and the beneficial effects of a small defrosting heat loss, a good defrosting effect and a good user experience are achieved.

Other features and advantages of the present disclosure will be explained in the following description, and will partially become apparent from the description or be appreciated by implementing the present disclosure.

The technical solutions of the present disclosure will be further described below in detail by embodiments with reference to the accompanying drawings.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
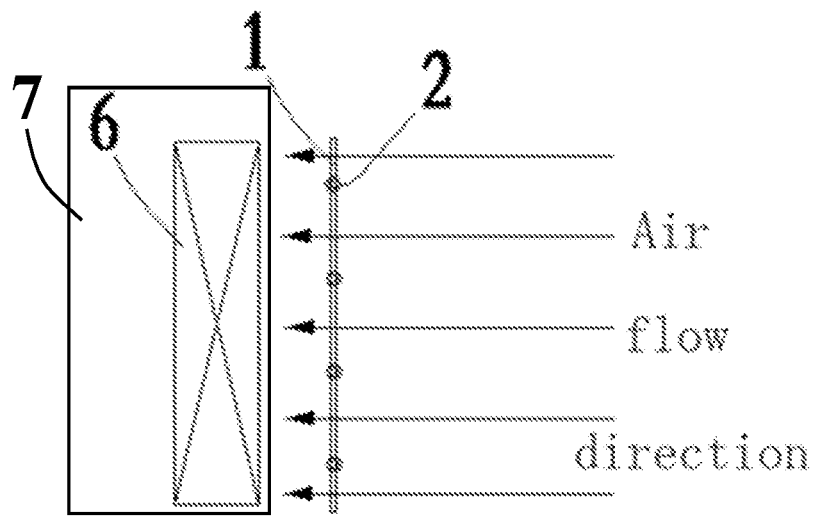
FIG. 1 is a schematic structure diagram of an embodiment of the airbag device in the defrosting device according to the present disclosure, when in a non-inflated state.

Combined with the drawings, reference numerals in the embodiments of the present disclosure are as follows:
1: mounting support; 11: first vertical rod; 12: first horizontal rod; 13: second vertical rod; 14: second horizontal rod; 2: airbag; 21: annular airbag; 22: rectangular airbag; 3: air pipe; 4: air pump; 5: air exhaust valve; 6: outdoor heat exchanger; and 7: air conditioner to be controlled.

DETAILED DESCRIPTION OF THE EMBODIMENTS

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention.

In order to make the objectives, technical solutions and advantages of the present disclosure clearer, the technical solutions of the present disclosure will be described clearly and completely by specific embodiments of the present disclosure with reference to the corresponding drawings. Apparently, the embodiments to be described are merely some but not all of the embodiments. All other embodiments obtained by a person of ordinary skill in the art based on the embodiments of the present disclosure without paying any creative effort shall fall into the protection scope of the present disclosure.

In an example, as a solution, an adjustable air-inlet grille may be used in the front of an outdoor heat exchanger of an automobile. When a heat-pump automobile air conditioner enters a defrosting mode, the air-let grille is driven to be closed by the motor, so that the formation of high-speed air flowing on the surface of the outdoor heat exchanger is avoided when the automobile is running. Thus, the heat loss on the surface of the outdoor heat exchanger is reduced, and the defrosting efficiency is improved. However, it has been proved that this solution has the problems of complicated structure and high cost of the air-inlet grille device, as well as low reliability which is caused because the moving parts are easily jammed and damaged, etc.

In accordance with an embodiment of the present disclosure, a defrosting control device is provided. FIG. 1 shows a schematic structure diagram of an embodiment of the device according to the present disclosure. The defrosting control device may include an airbag device.

In an optional implementation, the airbag device may be configured to, when an air conditioner to be controlled enters a defrosting mode, form an airbag layer to isolate an outdoor heat exchanger of the air conditioner to be controlled from flowing air outside the outdoor heat exchanger, so that the heat loss, which is caused because the heat, usable for defrosting, discharged into the outdoor heat exchanger by a compressor of the air conditioner to be controlled is taken away by the external flowing air, is reduced.

For example, after the heat-pump automobile air conditioner enters the defrosting mode, the airbag device is inflated to isolate the outdoor heat exchanger from air flowing in the front of the automobile, that is, no air flows on the surface of the outdoor heat exchanger when the automobile is running. Thus, no defrosting heat loss of the air conditioner system is caused, and the energy is saved.

The way of forming, by the airbag device, the airbag layer when the air conditioner to be controlled enters the defrosting mode may include: the airbag device being in an inflating state or an inflated state.

For example, after the airbag device is inflated, the defrosting of the heat-pump automobile air conditioner can be quickened, the defrosting effect can be enhanced, and the comfort of passengers in the automobile can be improved.

For example, when the heat-pump automobile air conditioner enters the defrosting mode, the inflation to the airbag device at least including the airbag 2 begins. After the airbag device is inflated, the outdoor heat exchanger 6 is isolated from air flowing at a high rate in the front of the automobile.

Thus, by providing the airbag device, the airbag layer is formed in the defrosting mode to isolate the outdoor heat exchanger from the outside flowing air, so that the heat loss, which is caused because the heat, usable for defrosting, discharged into the outdoor heat exchanger by the compressor is taken away by the outside flowing air, is reduced, and the energy saving effect is good. Due to the reduction in the defrosting heat loss, both the defrosting efficiency and the defrosting reliability are improved.

In an optional example, the air conditioner to be controlled 7 may include a heat-pump automobile air conditioner.

In an optional specific example, when the air conditioner to be controlled may include a heat-pump automobile air conditioner, the flowing air outside the outdoor heat exchanger may include flowing air in the front of an automobile on which the heat-pump automobile air conditioner is mounted.

In an optional specific example, when the air conditioner to be controlled may include a heat-pump automobile air conditioner, the airbag device is arranged in the front of the automobile on which the heat-pump automobile air conditioner is mounted.

For example, the airbag device at least including the airbag 2 may be arranged on a mounting support in the front of the outdoor heat exchanger 6 of the heat-pump automobile air conditioner or on an existing air-inlet grille of the automobile.

Thus, by applying the airbag device to the heat-pump automobile air conditioner, the energy saving performance and reliability of defrosting of the heat-pump automobile air conditioner can be improved, the defrosting time can be saved, and the user's comfort in use can be improved.

In an optional implementation, the airbag device may be further configured to cancel the airbag layer when the air conditioner to be controlled does not enter the defrosting mode or exits the defrosting mode, so as to restore the heat exchange between the outdoor heat exchanger and the outside flowing air. For example, the heat exchange between the outdoor heat exchanger and the outside flowing air through an air inlet of the air conditioner to be controlled is restored.

The way of cancelling, by the airbag device, the airbag layer when the air conditioner to be controlled does not enter the defrosting mode may include: the airbag device being in a non-inflated state or collapsed state; and/or the way of cancelling, by the airbag device, the airbag layer when the air conditioner to be controlled exits the defrosting mode may include: the airbag device being in a deflating state or a deflated state.

For example, when the heat-pump automobile air conditioner exits the defrosting mode, air in the airbag 2 in the airbag device is exhausted, without affecting the heat exchange between the outdoor heat exchanger 6 and the inlet air in the front of the automobile.

For example, when the airbag is not in use, air in the airbag will be exhausted. Since the airbag itself is elastic, the airbag will be closely fitted with the mounting support or the matched air-inlet grille, so that the air inlet volume of the outdoor heat exchanger during the normal operation will not be affected and no noise will be generated.

Thus, by cancelling the isolation of the outdoor heat exchanger from the outside flowing air in the case where the heat-pump automobile air conditioner does not enter the defrosting mode or exits the defrosting mode, the heating or cooling operation is restored, and the operational reliability and humanization degree of the air conditioner are improved.

In an optional example, the airbag device may include an airbag 2 and an inflation mechanism.

For example, there is no need for any motor and adjustable grille device, so the number of operating components is reduced, the structure becomes simple, the reliability is high, and the cost is low.

In an optional specific example, the airbag 2 is arranged outside the outdoor heat exchanger.

When the air conditioner to be controlled may include a heat-pump automobile air conditioner, the airbag 2 is arranged in an air-inlet grille in the front of the automobile on which the heat-pump automobile air conditioner is mounted.

For example, the airbag 2 may be arranged on a mounting support in the front of the outdoor heat exchanger 6 of the heat-pump automobile air conditioner or on an existing air-inlet grille of the automobile. When the heat-pump automobile air conditioner enters the defrosting mode, the airbag 2 is inflated. After the airbag 2 is inflated, the outdoor heat exchanger 6 is isolated from air flowing at a high rate in the front of the automobile, so that heat from the outdoor heat exchanger 6 is prevented from being blown away during the defrosting process of the heat-pump automobile air conditioner. Accordingly, the defrosting of the heat-pump air conditioner is effectively quickened, the comfort of passengers is improved, and the industrial challenge for the existing heat-pump automobile air conditioners during the defrosting process is overcome.

In an optional specific example, the inflation mechanism is communicated with the airbag 2 and configured to, when the air conditioner to be controlled enters the defrosting mode, inflate the airbag 2 so that the airbag 2 forms the airbag layer.

In an optional specific example, when the airbag device may be further configured to cancel the airbag layer when the air conditioner to be controlled does not enter the defrosting mode or exits the defrosting mode, the inflation mechanism may be further configured to: maintain the airbag 2 in a non-inflated state or collapsed state so that the airbag 2 cancels the airbag layer, when the air conditioner to be controlled does not enter the defrosting mode.

In an optional specific example, when the airbag device may be further configured to cancel the airbag layer when the air conditioner to be controlled does not enter the defrosting mode or exits the defrosting mode, the airbag 2 is deflated when the air conditioner to be controlled exits the defrosting mode, so that the airbag 2 cancels the airbag layer.

Thus, by forming the airbag device by the airbag and the inflation mechanism, it is very convenient for inflation and deflation, and it is advantageous to improve the convenience and flexibility of defrosting control of the air conditioner.

More optionally, there is more than one airbag 2.

For example, the airbag device may include a plurality of airbags 2.

Thus, by using more than one airbag, the structure of the airbag layer and the way of forming the airbag layer can be more reliable and diverse, and it is convenient to use.

More optionally, the wall of the airbag 2 may include an elastic layer made of an elastic material.

The elastic material may include natural latex.

For example, the airbag 2 is made of an elastic material. The airbag 2 may be made of rubber with good elasticity, for example, natural latex or the like.

Thus, since the wall of the airbag is made of an elastic material, the airbag can be elastically collapsed, so that the air tightness of the airbag layer formed by the airbag can be improved and the isolation of the outdoor heat exchanger from the outside flowing air by the airbag layer can be improved.

Further optionally, the wall of the airbag 2 may further include at least one of a wear-resistant layer made of a wear-resistant material, a reinforcing layer made of a reinforcing material and an isolation layer made of an isolation material.

In a further optional example, the wear-resistant layer is arranged on an outer periphery of the elastic layer.

The wear-resistant material may include vulcanized butadiene rubber.

For example, in order to enhance the reliability and prolong the service life of the airbag 2, a layer of highly wear-resistant rubber (e.g., vulcanized butadiene rubber, etc.) is additionally provided on the rubber, so that the wear resistance, cold resistance and elasticity can be effectively improved.

In a further optional example, the reinforcing layer is arranged on an outer periphery of at least one of the elastic layer and the wear-resistant layer.

The reinforcing material may include at least one of nylon and glass fiber.

For example, it is also possible to add nylon, glass fiber or other materials in the outermost layer of rubber to reinforce the structure of the airbag 2.

In a further optional example, the isolation layer is arranged on an inner periphery of the elastic layer.

The isolation material may include an anti-adhesive material.

For example, in the airbag made of this material, an isolation layer made of an anti-adhesive material may be additionally provided in the innermost layer of rubber, in order to avoid the airbag from bonding together due to aging or other factors if the airbag is not used for a long period of time. The selection of the isolation layer may depend upon the aging test result of the material.

Thus, by properly arranging the wear-resistant layer, the reinforcing layer, the isolation layer and the like, the strength and durability of the airbag can be improved, the reliability of the airbag can be improved, and the service life of the airbag can be prolonged.

Optionally, the inflation mechanism may include an air pipe 3 and an air pump 4.

In a more optional specific example, an outlet end of the air pipe 3 is communicated with an air inlet end of the airbag 2.

In a more optional specific example, an air exhaust end of the air pump 4 is communicated with a first inlet end of the air pipe 3.

For example, the air pump 4 may be mounted in any suitable position. For example, the air pump 4 may be mounted and fixed on a condenser of the heat-pump automobile air conditioner, or on an automobile bracket in the vicinity of the condenser.

In a more optional specific example, the air pump 4 may be configured to rotate in a set inflation direction to inflate the airbag 2 so that the airbag 2 forms the airbag layer, when the air conditioner to be controlled enters the defrosting mode.

For example, the air pump 4 may be configured to suck air from the environment and inject the air into the airbag 2 through the air pipe 3 so as to inflate the airbag 2.

In a more optional specific example, the air pump 4 may be further configured to stop rotating to maintain the airbag 2 in the non-inflated state or collapsed state so that the airbag 2 cancels the airbag layer, when the air conditioner to be controlled does not enter the defrosting mode.

Figure 2:
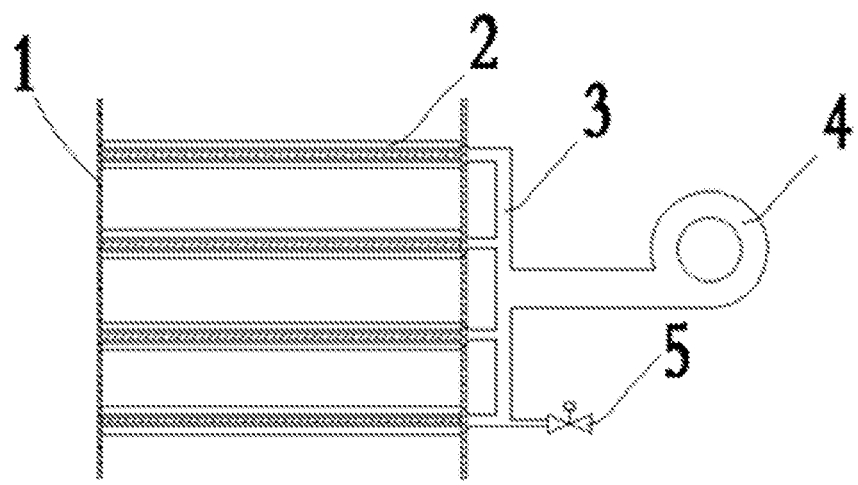
FIG. 2 is a schematic structure diagram of another embodiment of the airbag device in the defrosting device according to the present disclosure, when in the non-inflated state.

For example, in the examples shown in FIGS. 1 and 2, when the heat-pump automobile air conditioner operates in a conventional cooling or heating mode, the air pump 4 does not work, and the air exhaust valve 5 is in an ON state while being powered off. In this case, the airbag 2 is not inflated, and air in the front of the automobile is directly blown to the outdoor heat exchanger 6 through the mounting support 1, to ensure that the outdoor heat exchanger 6 can exchange heat with the ambient air.

In a more optional specific example, the air pump 4 may be further configured to rotate in a set deflation direction to take air away from the airbag 2 so as to deflate the airbag 2 so that the airbag 2 cancels the airbag layer, when the air conditioner to be controlled exits the defrosting mode.

For example, the air exhaust valve 5 can be removed. After defrosting completed by the heat-pump automobile air conditioner and when air in the airbag 2 is to be exhausted, the air pump 4 can be controlled to rotate in an opposite direction, and air in the airbag 2 can be exhausted by the suction force of the air pump 4 and the contraction force of the airbag 2 itself.

Thus, by exhausting air by the air pump, the structure is simplified, and the control reliability is improved. Moreover, the air exhaust structures such as the control valve can be omitted, and the cost can be reduced.

The deflation direction may include a direction opposite to the inflation direction.

Thus, by making the deflation direction opposite to the inflation direction, the air exhaust time can be reduced, the air exhaust efficiency can be improved, and the energy for the operation of the air pump can be saved.

More optionally, when the air conditioner to be controlled includes a heat-pump automobile air conditioner, the air pressure at the air exhaust end of the air pump 4 is greater than the sum of the contraction force of the airbag 2 itself and the wind pressure applied to the outer surface of the airbag 2 when the automobile on which the heat-pump automobile air conditioner is mounted runs at a set maximum speed.

For example, the air pressure at the air exhaust end of the air pump 4 is greater than the sum of the contraction force of the airbag 2 itself and the wind pressure applied to the outer surface of the airbag when the automobile runs at the maximum speed. In this way, the normal inflation of the airbag can be ensured. The contraction force of the airbag 2 itself is related to the used material, and the wind pressure applied to the outer surface of the airbag when the automobile runs at the maximum speed is related to the maximum speed of the automobile and the size of the surface of the airbag.

Thus, by setting the air pressure at the air exhaust end of the air pump 4, the inflation effect can be improved, the effect of isolation of the outdoor heat exchanger from the outside flowing air during the defrosting process can be improved, and both the defrosting effect and the energy saving effect can be improved.

More optionally, when there are more than two airbags 2, the outlet end of the air pipe 3 may include more than two outlet branches.

The number of the outlet branches is matched with the number of the airbags 2, and each of the outlet branches is communicated with the air inlet end of each of the airbags 2.

For example, the inlet end of the air pipe 3 is connected to the air pump 4, while the other end thereof is divided into a plurality of outlet ends, each of which is communicated with one airbag 2.

For example, one end of the air pipe 3 is an inlet end that is connected to the air pump 4; and, the other end of the air pipe 3 is an outlet end that is divided into a plurality of outlet branches, each of which is communicated with one airbag 2.

Thus, by dividing the outlet end of the air pipe into a plurality of outlet branches, a plurality of airbags can be inflated simultaneously. The structure is simple, the inflation efficiency is high, and it is advantageous to improve the defrosting efficiency and effect and enhance the energy saving effect and the user's comfort in use.

Optionally, the inflation mechanism may further include a control valve.

In a more optional specific example, the control valve is mounted at a second inlet end of the air pipe 3 and may be configured to control the second inlet end. When the air conditioner to be controlled enters the defrosting mode and the air pump 4 rotates in the inflation direction, the second inlet end is closed, so that the air pump 4 inflates the airbag 2 in the case where the second inlet end is closed.

Figure 3:
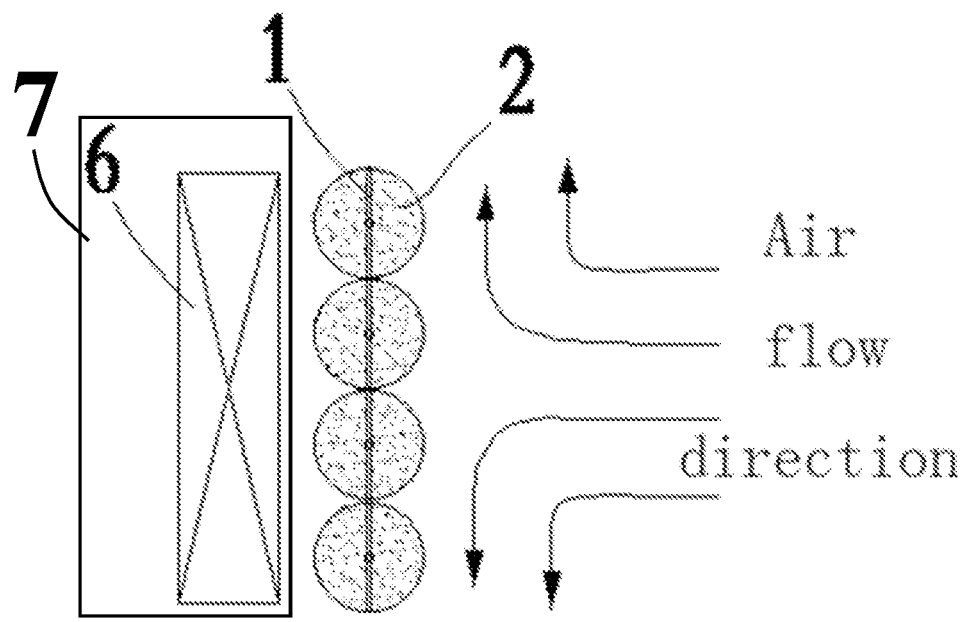
FIG. 3 is a schematic structure diagram of an embodiment of the airbag device (e.g., an airbag device including an annular airbag 21) in the defrosting device according to the present disclosure, when in an inflated state.
Figure 4:
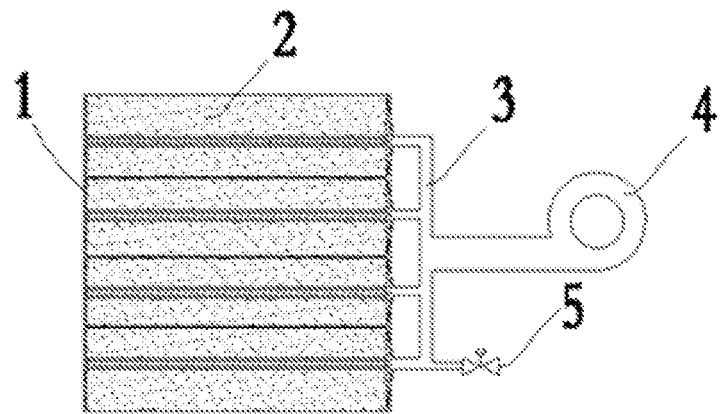
FIG. 4 is a schematic structure diagram of another embodiment of the airbag device (e.g., an airbag device including an annular airbag 21) in the defrosting device according to the present disclosure, when in the inflated state.

For example, in the examples shown in FIGS. 3 and 4, when the heat-pump automobile air conditioner enters the defrosting mode, it is necessary to remove frost condensed on the outdoor heat exchanger 6. In this case, the air exhaust valve 5 is turned off, and the air pump 4 is activated to inflate the airbag 2. After the airbag 2 is inflated, an airbag layer will be formed on the mounting support 1, and the high-speed air flow in the front of the automobile will be blocked by the airbag layer to diffuse around, so that the isolation of the outdoor heat exchanger 6 from the air flow in the front of the automobile is realized, and the air flow is prevented from taking away heat, usable for defrosting, discharged into the outdoor heat exchanger 6 by the compressor. Accordingly, the defrosting of the heat-pump air conditioner is effectively quickened, and the energy is saved.

In a more optional specific example, the control valve may be further configured to open the second inlet end to maintain the airbag 2 in the non-inflated state or collapsed state, when the air conditioner to be controlled does not enter the defrosting mode and the air pump 4 does not work.

For example, if the air valve (e.g., an air exhaust valve 5) is in an ON state, part of air will not enter the airbag to affect the normal operation of the cooling or heating mode. Since the airbag 2 itself is elastic and has a certain contraction force, and the airbag 2 is located in the front of the automobile, a certain wind pressure is applied to the surface of the airbag 2, and no air will enter the airbag from the air valve to affect the normal operation of the cooling or heating mode.

In a more optional specific example, the control valve may be further configured to close the second inlet end so that the air pump 4 deflates the airbag 2, when the air conditioner to be controlled exits the defrosting mode and the air pump 4 rotates in the deflation direction.

In a more optional specific example, the control valve may be further configured to open the second inlet end to deflate the airbag 2 through the second inlet end under the pressure of the outside flowing air, when the air conditioner to be controlled exits the defrosting mode and the air pump 4 stops rotating.

For example, the air exhaust valve 5 is mounted on the air pipe 3. When it is necessary to exhaust air in the airbag 2, the air exhaust valve 5 is turned on to communicate the interior of the airbag 2 with the atmosphere, so that air in the airbag 2 can be exhausted by the contraction force of the airbag 2 itself, that is, air in the airbag 2 is exhausted to the outside environment.

For example, the airbag 2 itself may be elastic and have a certain contraction force, and the airbag 2 is located in the front of the automobile, so a certain wind pressure is applied to the surface of the airbag 2. When the air exhaust valve 5 is in the ON state, air in the airbag 2 is automatically exhausted. According to the size of the valve port of the air exhaust valve 5 and the elasticity of the material of the airbag 2, the time required to deflate the airbag 2 can be determined. Then, the time to turn on the air exhaust valve 5 is controlled.

For example, after defrosting completed by the heat-pump automobile air conditioner, the air pump 4 is controlled to stop, and the air exhaust valve 5 is in the ON state while being powered off. In this case, the interior of the airbag 2 is communicated with the atmosphere, and air in the airbag 2 can be exhausted by the contraction force of the airbag 2 itself and the wind pressure in the front of the automobile.

Thus, since the control valve assists in controlling the inflation and deflation of the airbag, the reliability of inflation and deflation can be improved, and the defrosting reliability and user experience can be further improved.

More optionally, when the inflation mechanism may further includes a control valve, and when the air conditioner to be controlled may include a heat-pump automobile air conditioner, the outlet of the control valve faces the tail or two sides of the automobile on which the heat-pump automobile air conditioner is mounted, but does not face the front of the automobile.

For example, since the outlet of the air exhaust valve 5 faces the tail or two sides of the automobile but does not face the front of the automobile, the air flowing in the front of the automobile is prevented from affecting the exhaust of air in the airbag.

Thus, by setting the outlet direction of the air exhaust, the reliability and safety of the airbag can be improved, and it can be ensured that the normal operation of the air conditioner is not affected by the airbag.

More optionally, the control valve may include an air exhaust vale 5. The air exhaust valve 5 may include at least one of a solenoid valve and a pneumatic valve.

For example, the airbag device may consist of an airbag 2, an air pipe 3, an air pump 4, an air exhaust vale 5, etc.

The solenoid valve may include a normally-open solenoid valve.

For example, the air exhaust valve 5 may be a normally-open solenoid valve, or may be a control valve in the form of a pneumatic valve or the like.

Thus, the flexibility and reliability of auxiliary control on inflation and deflation can be improved by using various forms of control valves.

In an optional example, the airbag device may further include a mounting support 1.

For example, the airbag device may also consist of a mounting support 1, an airbag 2, an air pipe 3, an air pump 4, an air exhaust vale 5, etc.

For example, the mounting support 1 may be the above-described mounting support in the front of the outdoor heat exchanger 6 of the heat-pump automobile air conditioner, or may also be other mounting supports provided additionally.

In an optional specific example, the mounting support 1 is mounted outside the outdoor heat exchanger, and may be configured to mount the airbag 2.

For example, in the examples shown in FIGS. 1, 2, 3 and 4, the airbag device is mounted in the front of the outdoor heat exchanger 6.

When the air conditioner to be controlled may include a heat-pump automobile air conditioner, the mounting support 1 is mounted in the front of the outdoor heat exchanger 6 of the heat-pump automobile air conditioner.

For example, the airbag 2 may be arranged on the mounting support in the front of the outdoor heat exchanger 6 of the heat-pump automobile air conditioner.

Thus, by arranging the airbag on the mounting support, the mounting firmness of the airbag and the diversity and flexibly of the arrangement of the airbag can be improved, and the isolation effect of the airbag layer formed by the airbag can also be improved.

Optionally, the mounting support 1 may include positioning rods.

In an optional specific example, there is a plurality of positioning rods.

In an optional specific example, adjacent two of the plurality of positioning rods are respectively arranged at two ends of the airbag 2, so that the airbag 2 can be positioned between the adjacent two of the plurality of positioning rods.

When the mounting support is divided into several sections in the direction of the horizontal rod and one airbag is mounted on each section, a plurality of positioning rods are required.

Thus, by properly arranging the positioning rods, the airbag can be fixed, so that the airbag will not be blown away or deviated by the outside flowing air, and it is advantageous to improve the isolation effect.

Optionally, the mounting support 1 may further include a support rod.

In an optional specific example, the airbag 2 is arranged above and/or below the support rod, and/or sheathed on the outer periphery of the support rod.

In an optional specific example, there is more than one support rod. The more than one support rod is arranged between the adjacent two of the plurality of positioning rods and may be configured to support and/or fix the airbag 2.

Thus, by arranging the support rod, the reliability of fixing and supporting the airbag can be further improved, and the formation effect and isolation effect of the airbag layer can be better improved.

Optionally, the mounting support 1 may be mounted in at least one of a transverse direction, a vertical direction and an inclined direction.

For example, the form of the mounting support 1 may be flexibly set according to the actual situations of the structural layout of the automobile itself and the structural size of the outdoor heat exchanger 6.

In an optional specific example, when the mounting support 1 is mounted in the horizontal direction, the positioning rod may include a first vertical rod 11. The support rod may include a first horizontal rod 12.

Figure 5:
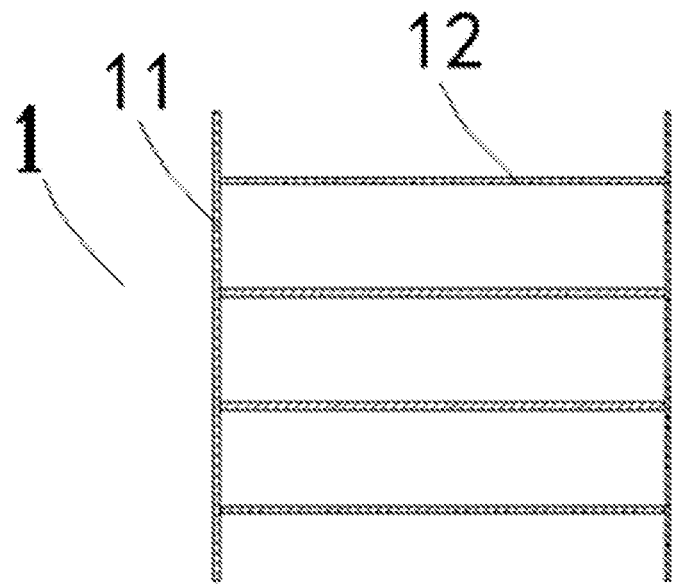
FIG. 5 is a transversely schematic view of an embodiment of the mounting support of the airbag device in the defrosting device according to the present disclosure.

For example, as shown in FIG. 5, the mounting support 1 may consist of a plurality of first vertical rods 11 and a plurality of horizontal rods 12. The first vertical rods 11 may be distributed at two ends of the mounting support 1, and the plurality of horizontal rods 12 are arranged between two ends of the mounting support 1 to be connected to the first vertical rods 11. The first horizontal rods 12 may be configured to support and fix airbags 2.

For example, the number of airbags 2 is equal to the number of first horizontal rods 12, and each airbag 2 is correspondingly fitted with the first horizontal rod 12 of the mounting support 1.

In an optional specific example, when the mounting support 1 is mounted in the vertical direction, the positioning rod may include a second horizontal rod 14. The support rod may include a second vertical rod 13.

Figure 8:
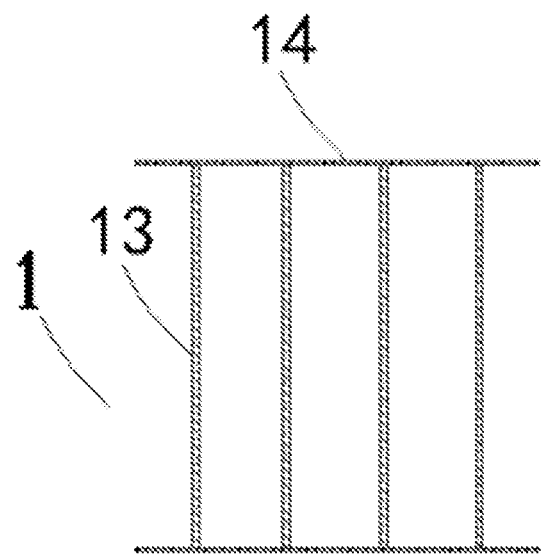
FIG. 8 is a vertically schematic view of an embodiment of the mounting support of the airbag device in the defrosting device according to the present disclosure.

For example, as shown in FIG. 8, based on the optimal implementation, the mounting support 1 may be designed to be arranged in the vertical direction, the second horizontal rods 14 are distributed at upper and lower ends of the mounting support 1, and a plurality of second vertical rods 13 are arranged between the upper and lower ends of the mounting support 1 to be connected to the second horizontal rods 14. The second vertical rods 13 may also be configured to support and fix airbags 2.

Optionally, the airbag 2 is arranged above and/or below the support rod, and the structure of the airbag 2 may include an integral bag-like structure and/or a socketed bag-like structure. The integral bag-like structure and/or the socketed bag-like structure is adhered and/or hung to the support rod.

Thus, by adhering or hanging the airbag to the support rod, it may be easy for mounting, and it is convenient for use and maintenance.

Optionally, when the airbag 2 is sheathed on the outer periphery of the support rod, the structure of the airbag 2 may include a socketed bag-like structure. The socketed bag-like structure is sheathed on the support rod through a middle through hole axially formed thereon.

Thus, by sheathing the airbag on the support rod, both the mounting firmness and the reliability in use are high.

More optionally, when the air conditioner to be controlled may include a heat-pump automobile air conditioner and the airbag 2 is arranged in an air-inlet grille in the front of the automobile on which the heat-pump automobile air conditioner is mounted, the shape of the middle through hole is matched with that of the air-inlet grille and can be adjusted according to the shape of the air-inlet grille.

For example, the mounting support 1 can be omitted, and the airbag 2 can be directly fixed on the existing air-inlet grille of the automobile. Due to different structures and shapes of air-inlet grilles of automobiles, the shape of the middle through hole of the airbag 2 can be adjusted according to the actual shape of the air-inlet grille.

For example, the mounting support 1 and the related mounting and fixation devices can be omitted, so the structure becomes simpler, and the cost can also be reduced.

Thus, since the middle through hole of the airbag can be matched and adjusted according to the shape of the air-inlet grille, the convenience and universality in use can be improved, and the reliability is high.

More optionally, the shape of the radial cross-section of the socketed bag-like structure may include at least one of a circular ring, a rectangular ring, and an arc-shaped ring with a set radian on its surface.

Figure 9:
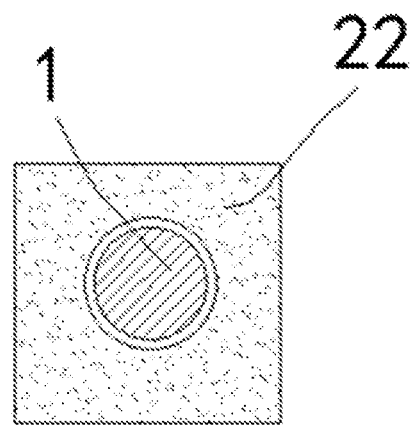
FIG. 9 is a sectional view of another embodiment of the airbag (e.g., a rectangular airbag 22) in the defrosting device according to the present disclosure.

For example, as shown in FIG. 9, the shape of the airbag 2 after being inflated may not be limited to be annular (i.e., an annular airbag 21), the shape of the airbag 2 may be preset to be rectangular (e.g., a rectangular airbag 22) or in other shapes, and a certain radian may be preset on the surface of the airbag.

Thus, by using various shapes of the radial cross-section, the arrangement flexibility and use convenience of the airbag with the socketed bag-like structure can be improved, with wide range of applications and strong universality.

In an optional specific example, when the shape of the radial cross-section may include a circular ring, the airbag 2 may include an annular airbag 21.

Figure 6:
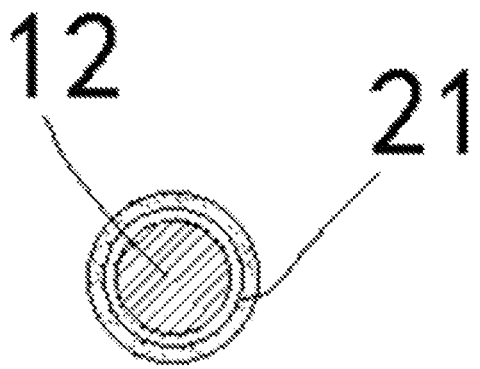
FIG. 6 is a radially sectional view of an embodiment of the airbag (e.g., an annular airbag 21) in the defrosting device according to the present disclosure.
Figure 7:
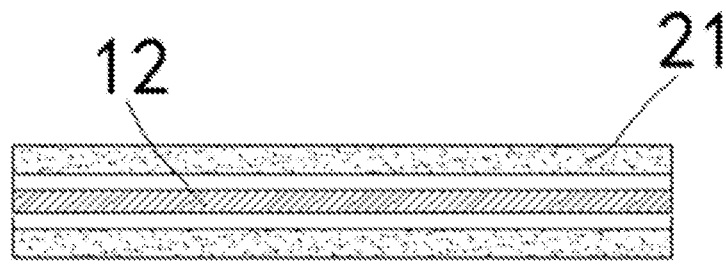
FIG. 7 is an axially sectional view of an embodiment of the airbag (e.g., an annular airbag 21) in the defrosting device according to the present disclosure.

For example, as shown in FIGS. 6 and 7, the airbag 2 may include an annular airbag 21 with a through hole formed in its middle, and the first horizontal rod 12 of the mounting support 1 is fitted with the annular airbag 21 via the through hole.

When the annular airbag 21 is made of an elastic material, in the non-inflated state, the annular airbag 21 will be collapsed and tightly sheathed on the outer wall of the first horizontal rod 12. When the annular airbag 21 is in the inflated state, an annular portion of the annular airbag 21 will be expanded due to inflation. In the non-inflated state, the annular airbag 21 will be collapsed and tightly sheathed on the outer wall of the first horizontal rod 12.

For example, when a plurality of annular airbags 21 are inflated simultaneously, two annular airbags 21 on adjacent first horizontal rods 12 will be squeezed and close to each other to form an airbag layer.

During the inflation of the annular airbag 21, the diameter of the annular shape should be greater than the distance between two adjacent first horizontal rods 12 of the mounting support 1. In this way, it can be ensured that two adjacent airbags 21 can be closely fitted with each other during inflation and no air leakage will occur in the airbag layer.

Additionally, referring to the examples shown in FIGS. 6, 7 and 9, the blank part between the airbag and the horizontal rod indicates that the airbag is sheathed on the horizontal rod, and the airbag and the horizontal rod are separate structures that are not connected and fixed together.

Thus, by using the annular airbag, the mounting firmness of the airbag and the mounting support can be improved, and a plurality of airbags can be supported and fixed by the support rods to form an airbag layer more reliably. Accordingly, the effect of the isolation of the outdoor heat exchanger from the outside flowing air is improved, the heat for defrosting is saved and the defrosting efficiency is improved.

In an optional specific example, when the shape of the radial cross-section may include a rectangular ring, the airbag 2 may include a rectangular airbag 22.

Figure 10:
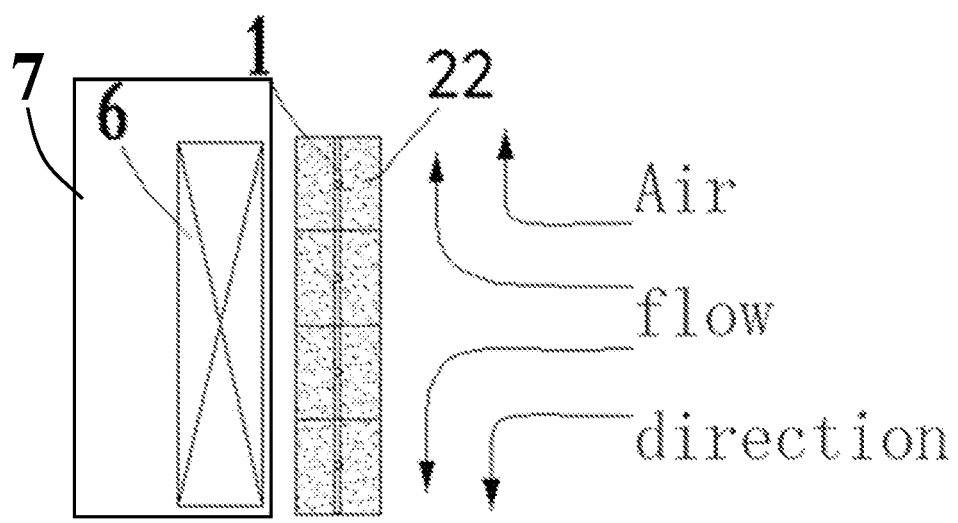
FIG. 10 is a schematic structure diagram of still another embodiment of the airbag device (e.g., an airbag device including a rectangular airbag 22) in the defrosting device according to the present disclosure, when in the inflated state.

For example, as shown in FIG. 10, when rectangular airbags 22 are filled with air to form an airbag layer, two adjacent rectangular airbags 22 can be closely fitted with each other, the surface of the airbag layer is smoother and more continuous, and the flow resistance of air is lower when the air flows on the said surface.

Thus, by using the rectangular airbag, the air tightness of the airbag device can be improved, the impact of the outside flowing air on the airbag device (e.g., the impact of the air flow in the front of the automobile on the airbag device) is reduced, and the reliability is thus improved.

It has been proved by lots of tests that, with the technical solutions of this embodiment, by providing an airbag, after a heat-pump automobile air conditioner enters a defrosting mode, the airbag device is inflated to isolate an outdoor heat exchanger from air flowing in the front of the automobile, that is, no air flows on the surface of the outdoor heat exchanger when the automobile is running, so that no defrosting heat loss of the air conditioner system is caused and the energy is saved. Accordingly, the heat waste of the air conditioner system, which is caused because high-speed flowing air will take away a large amount of heat on the surface of the outdoor heat exchanger after the heat-pump automobile air conditioner enters the defrosting mode, is solved.

In accordance with an embodiment of the present disclosure, an air conditioner corresponding to the defrosting control device is further provided. The air conditioner may include the defrosting control device described above.

In an optional implementation, in the solutions of the present disclosure, an airbag device at least including the airbag 2 may be arranged on a mounting support in the front of the outdoor heat exchanger 6 of the heat-pump automobile air conditioner or on an existing air-inlet grille of the automobile. When the heat-pump automobile air conditioner enters the defrosting mode, the inflation to the airbag device at least including the airbag 2 begins. After the airbag device is inflated, the outdoor heat exchanger 6 is isolated from air flowing at a high rate in the front of the automobile. When the heat-pump automobile air conditioner exits the defrosting mode, air in the airbags 2 in the airbag device is exhausted, without affecting the heat exchange between the outdoor heat exchanger 6 and the inlet air in the front of the automobile.

For example, in the solutions of the present disclosure, the airbag 2 can be arranged on a mounting support in the front of the outdoor heat exchanger 6 of the heat-pump automobile air conditioner or on an existing air-inlet grille of the automobile. When the heat-pump automobile air conditioner enters the defrosting mode, the airbag 2 is inflated. After the airbag 2 is inflated, the outdoor heat exchanger 6 is isolated from air flowing at a high rate in the front of the automobile, so that the heat from the outdoor heat exchanger 6 is prevented from being blown away during the defrosting process of the heat-pump automobile air conditioner. Accordingly, the defrosting of the heat-pump air conditioner is effectively quickened, the comfort of passengers is improved, and the industrial challenge for the existing heat-pump automobile air conditioners during the defrosting process is overcome.

In an optional example, in the examples shown in FIGS. 1, 2, 3 and 4, the airbag device is mounted in the front of the outdoor heat exchanger 6.

In an optional example, the airbag device may consist of an airbag 2, an air pipe 3, an air pump 4, an air exhaust vale 5, etc.

In an optional example, the airbag device may also consist of a mounting support 1, an airbag 2, an air pipe 3, an air pump 4, an air exhaust vale 5, etc. The mounting support 1 may be the above-described mounting support in the front of the outdoor heat exchanger 6 of the heat-pump automobile air conditioner, or may also be other mounting supports provided additionally.

Optionally, as shown in FIG. 5, the mounting support 1 may consist of a plurality of first vertical rods 11 and a plurality of horizontal rods 12.

More optionally, the first vertical rods 11 may be distributed at two ends of the mounting support 1, and the plurality of horizontal rods 12 are arranged between two ends of the mounting support 1 to be connected to the first vertical rods 11. The first horizontal rods 12 may be configured to support and fix the airbag 2.

Optionally, the airbag device may include a plurality of airbags 2. The number of airbags 2 is equal to the number of first horizontal rods 12, and each airbag 2 is correspondingly fitted with the first horizontal rod 12 of the mounting support 1.

Optionally, the airbag 2 is made of a material with elasticity.

More optionally, the airbag 2 may be made of rubber with good elasticity, for example, natural latex or the like. Meanwhile, in order to enhance the reliability and prolong the service life of the airbag 2, a layer of highly wear-resistant rubber (e.g., vulcanized butadiene rubber, etc.) is additionally provided on the rubber, so that the wear resistance, cold resistance and elasticity can be effectively improved. Finally, it is also possible to add nylon, glass fiber or other materials in the outermost rubber layer to reinforce the structure of the airbag 2.

More optionally, in the airbag made of this material, an isolation layer made of an anti-adhesive material can be additionally provided in the innermost layer of rubber, in order to avoid the airbag from bonding together due to aging or other factors if the airbag is not used for a long period of time. The selection of the isolation layer may depend upon the aging test result of the material.

Optionally, as shown in FIGS. 6 and 7, the airbag 2 may include an annular airbag 21 with a through hole formed in its middle, and the first horizontal rod 12 of the mounting support 1 is fitted with the annular airbag 21 via the through hole.

More optionally, when the annular airbag 21 is made of an elastic material, in the non-inflated state, the annular airbag 21 will be collapsed and tightly sheathed on the outer wall of the first horizontal rod 12. When the annular airbag 21 is in the inflated state, an annular portion of the annular airbag 21 will be expanded due to inflation.

For example, in the examples shown in FIGS. 6 and 7, in the non-inflated state, the annular airbag 21 will be collapsed and tightly sheathed on the outer wall of the first horizontal rod 12.

More optionally, when a plurality of annular airbags 21 are inflated simultaneously, two annular airbags 21 on adjacent first horizontal rods 12 will be squeezed and close to each other to form an airbag layer.

More optionally, during the inflation of the annular airbag 21, the diameter of the annular shape should be greater than the distance between two adjacent first horizontal rods 12 of the mounting support 1. In this way, it can be ensured that two adjacent airbags 21 can be closely fitted with each other during inflation and no air leakage will occur in the airbag layer.

Optionally, the inlet end of the air pipe 3 is connected to the air pump 4, while the other end thereof is divided into a plurality of outlet ends, each of which is communicated with one airbag 2.

For example, one end of the air pipe 3 is an inlet end that is connected to the air pump 4; and, the other end of the air pipe 3 is an outlet end that is divided into a plurality of outlet branches, each of which is communicated with one airbag 2.

Optionally, the air pump 4 may be configured to suck air from the environment and inject the air into the airbag 2 through the air pipe 3 so as to inflate the airbag 2. The air pressure at the air exhaust end of the air pump 4 is greater than the sum of the contraction force of the airbag 2 itself and the wind pressure applied to the outer surface of the airbag when the automobile runs at the maximum speed, so that the normal inflation of the airbag can be ensured. The contraction force of the airbag 2 itself is related to the used material, and the wind pressure applied to the outer surface of the airbag when the automobile runs at the maximum speed is related to the maximum speed of the automobile and the size of the surface of the airbag.

The air pump 4 may be mounted in any suitable position. For example, the air pump 4 may be mounted and fixed on a condenser of the heat-pump automobile air conditioner, or on an automobile bracket in the vicinity of the condenser.

Optionally, the air exhaust valve 5 may be a normally-open solenoid valve, or may be a control valve in the form of a pneumatic valve or the like.

Optionally, the air exhaust valve 5 is mounted on the air pipe 3. When it is necessary to exhaust air in the airbag 2, the air exhaust valve 5 is turned on to communicate the interior of the airbag 2 with the atmosphere, so that the air in the airbag 2 can be exhausted by the contraction force of the airbag 2 itself, that is, the air inside the airbag 2 is exhausted to the outside environment.

The airbag 2 itself may be elastic and have a certain contraction force, and the airbag 2 is located in the front of the automobile, so a certain wind pressure is applied to the surface of the airbag 2. When the air exhaust valve 5 is in the ON state, air in the airbag 2 is automatically exhausted. According to the size of the valve port of the air exhaust valve 5 and the elasticity of the material of the airbag 2, the time required to deflate the airbag 2 can be determined. Then, the time to turn on the air exhaust valve 5 is controlled.

For example, if the air valve (e.g., an air exhaust valve 5) is in an ON state, part of air will not enter the airbag to affect the normal operation of the cooling or heating mode. Since the airbag 2 itself is elastic and has a certain contraction force, and the airbag 2 is located in the front of the automobile, a certain air pressure is applied to the surface of the airbag 2, and no air will enter the airbag from the air valve to affect the normal operation of the cooling or heating mode.

More optionally, since the outlet of the air exhaust valve 5 faces the tail or two sides of the automobile but does not face the front of the automobile, the air flowing in the front of the automobile is prevented from affecting the exhaust of air in the airbag.

In an optional specific example, the principle of controlling the airbag device will be described.

In the examples shown in FIGS. 1 and 2, when the heat-pump automobile air conditioner operates in a conventional cooling or heating mode, the air pump 4 does not work, and the air exhaust valve 5 is in an ON state while being powered off. In this case, the airbag 2 is not inflated, and air in the front of the automobile is directly blown to the outdoor heat exchanger 6 through the mounting support 1, to ensure that the outdoor heat exchanger 6 can exchange heat with the ambient air.

In an optional specific example, in the examples shown in FIGS. 3 and 4, when the heat-pump automobile air conditioner enters the defrosting mode, it is necessary to remove frost condensed on the outdoor heat exchanger 6. In this case, the air exhaust valve 5 is turned off, and the air pump 4 is activated to inflate the airbag 2. After the airbag 2 is inflated, an airbag layer will be formed on the mounting support 1, and the high-speed air flow in the front of the automobile will be blocked by the airbag layer to diffuse around, so that the isolation of the outdoor heat exchanger 6 from the air flow in the front of the automobile is realized, and the heat, usable for defrosting, discharged into the outdoor heat exchanger 6 by the compressor is prevented from being taken away by the air flow to result in loss of heat. Accordingly, the defrosting of the heat-pump air conditioner is effectively quickened, and the energy is saved.

After defrosting completed by the heat-pump automobile air conditioner, the air pump 4 is controlled to stop working, and the air exhaust valve 5 is in the ON state while being powered off. In this case, the interior of the airbag 2 is communicated with the atmosphere, and air in the airbag 2 can be exhausted by the contraction force of the airbag 2 itself and the wind pressure in the front of the automobile.

In an alternative example, as shown in FIG. 8, based on the optimal implementation, the mounting support 1 may also be designed to be arranged in the vertical direction, the second horizontal rods 14 are distributed at upper and lower ends of the mounting support 1, and a plurality of second vertical rods 13 are arranged between the upper and lower ends of the mounting support 1 to be connected to the second horizontal rods 14. The second vertical rods 13 may also be configured to support and fix airbags 2.

During specific implementations, with this alternative solution, the form of the mounting support 1 can be flexibly set according to the actual situations such as the structural layout of the automobile itself and the structural size of the outdoor heat exchanger 6.

In an alternative example, based on the optimal implementation, the mounting support 1 can be omitted, and the airbag 2 is directly fixed on the existing air-inlet grille of the automobile. Due to different structures and shapes of the air-inlet grilles of automobiles, the middle through hole of the airbag 2 can be adjusted according to the actual shape of the air-inlet grille.

With this alternative solution, the mounting support 1 and the related mounting and fixation device can be omitted, so the structure becomes simpler, and the cost can also be reduced.

In an alternative solution, as shown in FIG. 9, the shape of the airbag 2 after being inflated may not be limited to be annular (i.e., an annular airbag 21), the shape of the airbag 2 may be preset to be rectangular (e.g., a rectangular airbag 22) or in other shapes, and a certain radian may be preset on the surface of the airbag.

Optionally, as shown in FIG. 10, when rectangular airbags 22 are filled with air to form an airbag layer, two adjacent rectangular airbags 22 can be closely fitted with each other, the surface of the airbag layer is smoother and more continuous, and the flow resistance of air when flowing on the surface is lower.

With this alterative solution, the air tightness of the airbag device can be improved, the impact of the air flow in the front of the automobile on the airbag device can be reduced, and the reliability can be improved.

In an alternative example, based on the optimal implementation, the air exhaust valve 5 can be removed. After defrosting completed by the heat-pump automobile air conditioner and when the air in the airbag 2 is to be exhausted, the air pump 4 can be controlled to rotate in an opposite direction, and air in the airbag 2 can be exhausted by the suction force of the air pump 4 and the contraction force of the airbag 2 itself.

With this alternative solution, the structure becomes simpler and the cost can be reduced.

It can be found that the solutions of the present disclosure can at least achieve the following beneficial effects.

(1) After the heat-pump automobile air conditioner enters the defrosting mode, the airbag device is inflated to isolate an outdoor heat exchanger from air flowing in the front of the automobile, that is, no air flows on the surface of the outdoor heat exchanger even when the automobile is running, so that no defrosting heat loss of the air conditioner system is caused and the energy is saved. Accordingly, the problem of the heat waste of the air conditioner system, which is caused because high-speed flowing air will take away a large amount of heat on the surface of the outdoor heat exchanger after the heat-pump automobile air conditioner enters the defrosting mode, is solved.

(2) After the airbag device is inflated, the defrosting of the heat-pump automobile air conditioner can be quickened, the defrosting effect can be enhanced, and the comfort of passengers in the automobile can be improved. Accordingly, the problem that the comfort of passengers in the automobile is seriously affected due to slow or even failed defrosting of the heat-pump automobile air conditioner is solved.

(3) There is no need for any motor and adjustable grille device, so the number of operating components is reduced, the structure becomes simple, the reliability is high and the cost is low. Accordingly, the problems of complicated structure and high cost of the adjustable grille device driven by the motor, as well as low reliability which is caused because the moving parts are easily jammed and damaged, are solved.

(4) When the airbag is not in use, air in the airbag will be exhausted. Since the airbag itself is elastic, the airbag will be closely fitted with the mounting support or the matched air-inlet grille, so that the air inlet volume of the outdoor heat exchanger during the normal operation will not be affected and no noise will be generated. Accordingly, the problem that the adjustable air-inlet grille device driven by the motor is likely to affect the air inlet volume of the outdoor heat exchanger due to inaccurate resetting and possible to generate noise is solved.

Since the processes and functions realized by the air conditioner in this embodiment basically correspond to the embodiments, principles and examples of the device shown in FIGS. 1-10, the non-exhaustive aspects in the description of this embodiment may refer to the relevant description in the above embodiments and will not be repeated here.

It has been proved by lots of tests that, with the technical solutions of the present disclosure, by isolating the outdoor heat exchanger from flowing air in the front of the automobile by the airbag, the defrosting of the heat-pump automobile air conditioner can be quickened, the defrosting effect can be enhanced and the comfort of passengers in the automobile can be improved. Accordingly, the problem that the comfort of passengers in the automobile is seriously affected due to slow or even failed defrosting of the heat-pump automobile air conditioner is solved.

In accordance with an embodiment of the present disclosure, corresponding to the air conditioner, a defrosting control method for an air conditioner is further provided. The defrosting control method for an air conditioner may include a step of: by the airbag device, forming an airbag layer when an air conditioner to be controlled enters a defrosting mode, to isolate an outdoor heat exchanger of the air conditioner to be controlled from flowing air outside the outdoor heat exchanger, so that the heat loss, which is caused because the heat, usable for defrosting, discharged into the outdoor heat exchanger by a compressor of the air conditioner to be controlled is taken away by the outside flowing air, is reduced.

For example, after the heat-pump automobile air conditioner enters the defrosting mode, the airbag device is inflated to isolate the outside heat exchange from flowing air in the front of the automobile, that is, no air flows on the surface of the outdoor heat exchanger even when the automobile is running. Thus, no defrosting heat loss of the air conditioner system is caused, and the energy is saved.

The way of forming, by the airbag device, the airbag layer when the air conditioner to be controlled enters the defrosting mode may include: the airbag device being in an inflating state or an inflated state.

For example, after the airbag device is inflated, the defrosting of the heat-pump automobile air conditioner can be quickened, the defrosting effect can be enhanced, and the comfort of passengers in the automobile can be improved.

For example, when the heat-pump automobile air conditioner enters the defrosting mode, the inflation to the airbag device at least including the airbag 2 begins. After the airbag device is inflated, the outdoor heat exchanger 6 is isolated from air flowing at a high rate in the front of the automobile.

Thus, by providing the airbag device, the airbag layer is formed in the defrosting mode to isolate the outdoor heat exchanger from the outside flowing air, so that the heat loss, which is caused because the heat, usable for defrosting, discharged into the outdoor heat exchanger by the compressor is taken away by the outside flowing air, is reduced, and the energy saving effect is good. Due to the reduction in the defrosting heat loss, both the defrosting efficiency and the defrosting reliability are improved.

In an optional implementation, the method may further include a step of: by the airbag device, cancelling the airbag layer when the air conditioner to be controlled does not enter the defrosting mode or exits the defrosting mode, so as to restore the heat exchange between the outdoor heat exchanger and the outside flowing air. For example, the heat exchange between the outdoor heat exchanger and the outside flowing air through an air inlet of the air conditioner to be controlled is restored.

The way of cancelling, by the airbag device, the airbag layer when the air conditioner to be controlled does not enter the defrosting mode can include: the airbag device being in a non-inflated state or collapsed state; and/or the way of cancelling, by the airbag device, the airbag layer when the air conditioner to be controlled exits the defrosting mode can include: the airbag device being in a deflating state or a deflated state.

For example, when the heat-pump automobile air conditioner exits the defrosting mode, air in the airbag 2 in the airbag device is exhausted, without influencing the heat exchange between the outdoor heat exchanger 6 and the inlet air in the front of the automobile.

For example, when the airbag is not in use, air in the airbag will be exhausted. Since the airbag itself is elastic, the airbag will be closely fitted with the mounting support or the matched air-inlet grille, so that the air inlet volume of the outdoor heat exchanger during the normal operation will not be affected and no noise will be generated.

Thus, by cancelling the isolation of the outdoor heat exchanger from the outside flowing air in the case of where the heat-pump automobile air conditioner does not enter the defrosting mode or exits the defrosting mode, the heating or cooling operation is restored, and the operational reliability and humanization degree of the air conditioner are improved.

Optionally, when the air conditioner includes a heat-pump automobile air conditioner and the heat-pump automobile air conditioner enters the defrosting mode, the step of forming an airbag layer when the air conditioner to be controlled enters the defrosting mode may include: turning off an air exhaust valve 5 of the heat-pump automobile air conditioner, and activating an air pump 4 of the heat-pump automobile air conditioner to inflate an airbag 2 of the heat-pump automobile air conditioner; and, after the airbag 2 is inflated, forming an airbag layer on a mounting support 1 of the heat-pump automobile air conditioner, so that an air flow in the front of an automobile on which the heat-pump automobile air conditioner is mounted is blocked by the airbag layer to diffuse around and the isolation of an outdoor heat exchanger 6 of the heat-pump automobile air conditioner from the air flow in the front of the automobile is realized.

Optionally, when the air conditioner includes a heat-pump automobile air conditioner and the heat-pump automobile air conditioner enters the defrosting mode, the step of cancelling the airbag layer when the air conditioner to be controlled does not enter the defrosting mode or exits the defrosting mode may include: after defrosting completed by the heat-pump automobile air conditioner, controlling the air pump 4 of the heat-pump automobile air conditioner to stop working, keeping the air exhaust valve 5 of the heat-pump automobile air conditioner in an ON state while being powered off, communicating the interior of the airbag 2 of the heat-pump automobile air conditioner with the atmosphere, and exhausting air in the airbag 2 by the contraction force of the airbag 2 itself and the wind pressure in the front of the automobile.

Thus, by controlling the air pump and the air exhaust valve, the airbag can be inflated to form an airbag layer, or the airbag can be deflated to cancel the airbag layer. The control structure is simple and the control method is convenient, with high reliability and high safety.

Since the processes and functions realized by the method in this embodiment basically correspond to the embodiments, principles and examples of the air conditioner described above, the non-exhaustive aspects in the description of this embodiment may refer to the relevant description in the above embodiments and will not be repeated here.

It has been proved by lots of tests that, with the technical solutions of the present disclosure, the defrosting of the heat-pump automobile air conditioner is quickened by the airbag, without requiring any motor and adjustable grille device, so the number of operating components is reduced, the structure becomes simple, the reliability is high and the cost is low. Accordingly, the problems of complicated structure and high cost of the adjustable grille device driven by the motor, as well as low reliability which is caused because the moving parts are easily jammed and damaged, are solved.

In conclusion, it will be readily understood by those skilled in the art that the above-described advantageous modes can be freely combined and superimposed if not conflicted.

The foregoing description merely shows the embodiments of the present disclosure and is not intended to limit the present disclosure. Various alterations and variations can be made to the present disclosure by those skilled in the art. Any modifications, equivalent replacements and improvements made without departing from the spirit and principle of the present disclosure shall fall into the scope defined by the claims of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A device for defrosting an air conditioner, comprising:
an airbag;
an air pipe connected to the airbag, the air pipe comprising a first opening, a second opening, and a third opening; and
an air pump; wherein
the device is configured to form an airbag layer by the airbag to isolate an outdoor heat exchanger of the air conditioner to be controlled from flowing air outside the outdoor heat exchanger, and
the first opening is configured to connect to an air exhaust end of the air pump and the second opening is configured to connect to a control valve; and the third opening of the air pipe is configured to connect to an opening of the airbag.

2. The device according to claim 1, wherein the device is further configured to deflate the airbag layer when the air conditioner to be controlled does not enter the defrosting mode or exits the defrosting mode,
wherein,
the air conditioner to be controlled comprises a heat-pump automobile air conditioner; and
the flowing air outside the outdoor heat exchanger comprises flowing air in a front of an automobile on which the heat-pump automobile air conditioner is mounted.

3. The device according to claim 1, wherein,
the air conditioner to be controlled comprises a heat-pump automobile air conditioner;
the airbag is arranged outside the outdoor heat exchanger; wherein, the airbag is arranged in an air-inlet grille in a front of an automobile on which the heat-pump automobile air conditioner is mounted;
the air pump is communicated with the airbag and configured to, when the air conditioner to be controlled enters a defrosting mode, inflate the airbag so that the airbag forms the airbag layer;
when the device is further configured to deflate the airbag layer when the air conditioner to be controlled does not enter the defrosting mode or exits the defrosting mode,
the air pump is further configured to: maintain the airbag in a non-inflated state or collapsed state so that the airbag deflates the airbag layer, when the air conditioner to be controlled does not enter the defrosting mode; and
deflate the airbag so that the airbag deflates the airbag layer, when the air conditioner to be controlled exits the defrosting mode.

4. The device according to claim 3, wherein,
the air pump is configured to:
rotate in a set inflation direction to inflate the airbag, when the air conditioner to be controlled enters the defrosting mode;
stop rotating to maintain the airbag in the non-inflated state or collapsed state, when the air conditioner to be controlled does not enter the defrosting mode; and
rotate in a set deflation direction to take air away from the airbag so as to deflate the airbag, when the air conditioner to be controlled exits the defrosting mode.

5. The device according to claim 4, further comprising the control valve, wherein the control valve is mounted at the second opening of the air pipe and configured to control the second opening; when the air conditioner to be controlled enters the defrosting mode and the air pump rotates in the inflation direction, the second opening is closed, so that the air pump inflates the airbag in the case where the second opening is closed;
when the air conditioner to be controlled does not enter the defrosting mode and the air pump does not rotate, the second opening is opened to maintain the airbag in the non-inflated state or collapsed state;
when the air conditioner to be controlled exits the defrosting mode and the air pump rotates in the deflation direction, the second opening is closed so that the air pump deflates the airbag; and
when the air conditioner to be controlled exits the defrosting mode and the air pump stops rotating, the second opening is opened to deflate the airbag through the second opening under the pressure of the outside flowing air.

6. The device according to claim 4, wherein,
a number of the airbag is more than one;
a number of branches is matched with the number of the airbags, and each of the branches is communicated with an opening end of each of the airbags;
a wall of the each of the airbags comprises an elastic layer made of an elastic material, wherein the elastic material comprises natural latex;
the deflation direction comprises a direction opposite to the inflation direction;
an air pressure at the air exhaust end of the air pump is greater than a sum of a contraction force of the each of the airbags and a wind pressure applied to outer surfaces of each of the airbags; and
the control valve comprises an air exhaust valve, and the air exhaust valve comprises at least one of a solenoid valve and a pneumatic valve, wherein the solenoid valve comprises a normally-open solenoid valve.

7. The device according to claim 3, wherein the device further comprises a mounting support;
the mounting support is mounted outside the outdoor heat exchanger and is configured to mount the airbag, wherein the mounting support is mounted in the front of the outdoor heat exchanger of the heat-pump automobile air conditioner.

8. The device according to claim 7, wherein the mounting support further comprises
a plurality of positioning rods; and
adjacent two of the plurality of positioning rods are respectively arranged at two ends of the airbag, to position the airbag between the adjacent two of the plurality of positioning rods.

9. The device according to claim 8, wherein the mounting support further comprises a support rod; and
the airbag is arranged above and/or below the support rod, and/or sheathed on an outer periphery of the support rod.

10. The device according to claim 9, wherein,
the mounting support can be mounted in at least one of a horizontal direction, a vertical direction and an inclined direction, wherein,
when the mounting support is mounted in the horizontal direction, the positioning rods comprise a first vertical rod, and the support rod comprises a first horizontal rod;
when the mounting support is mounted in the vertical direction, the positioning rods comprise a second horizontal rod, and the support rod comprises a second vertical rod;
when the airbag is arranged above and/or below the support rod, a structure of the airbag comprises an integral structure and/or a socketed structure that is adhered and/or hung to the support rod;
when the airbag is sheathed on the outer periphery of the support rod, the structure of the airbag comprises a socketed structure that is sheathed on the support rod through a middle through hole disposed on an interior of the airbag axially formed thereon;
wherein,
the shape of the middle through hole is matched with that of the air-inlet grille and can be adjusted according to the shape of the air-inlet grille; and
a shape of a radial cross-section of the socketed structure comprises at least one of a circular ring, a rectangular ring, and an arc-shaped ring with a set radian on its surface, wherein,
when the shape of the radial cross-section comprises a circular ring, the airbag comprises an annular airbag; and
when the shape of the radial cross-section comprises a rectangular ring, the airbag comprises a rectangular airbag.

11. An air conditioner, comprising the device according to claim 1.

12. A defrosting control method for the air conditioner according to claim 11, comprising a step of:
by the device, forming the airbag layer when the air conditioner to be controlled enters a defrosting mode, to isolate an outdoor heat exchanger of the air conditioner to be controlled from flowing air outside the outdoor heat exchanger.

13. The method according to claim 12, further comprising a step of:
by the device, deflating the airbag layer when the air conditioner to be controlled does not enter the defrosting mode or exits the defrosting mode.

14. The method according to claim 13, wherein, when the air conditioner comprises a heat-pump automobile air conditioner and the heat-pump automobile air conditioner enters the defrosting mode, the step of forming the airbag layer when the air conditioner to be controlled enters the defrosting mode comprises:
turning off an air exhaust valve of the heat-pump automobile air conditioner, and activating the air pump of the heat-pump automobile air conditioner to inflate an airbag of the heat-pump automobile air conditioner; and
after the airbag is inflated, forming the airbag layer on a mounting support of the heat-pump automobile air conditioner, so that an air flow in a front of an automobile on which the heat-pump automobile air conditioner is mounted is blocked by the airbag layer to diffuse around and an isolation of an outdoor heat exchanger of the heat-pump automobile air conditioner from the air flow in the front of the automobile is realized;

the step of deflating the airbag layer when the air conditioner to be controlled does not enter the defrosting mode or exits the defrosting mode comprises:

after defrosting completed by the heat-pump automobile air conditioner, controlling the air pump of the heat-pump automobile air conditioner to stop, maintaining the air exhaust valve of the heat-pump automobile air conditioner in an ON state while being powered off, communicating the interior of the airbag of the heat-pump automobile air conditioner with the atmosphere, and exhausting air in the airbag by a contraction force of the airbag itself and a wind pressure in the front of the automobile.

15. The device according to claim 2, wherein the air conditioner to be controlled comprises a heat-pump automobile air conditioner;

the airbag is arranged outside the outdoor heat exchanger; wherein, the airbag is arranged in an air-inlet grille in a front of an automobile on which the heat-pump automobile air conditioner is mounted;

the air pump is communicated with the airbag and configured to, when the air conditioner to be controlled enters the defrosting mode, inflate the airbag so that the airbag forms the airbag layer;

when the device is further configured to deflate the airbag layer when the air conditioner to be controlled does not enter the defrosting mode or exits the defrosting mode, the air pump is further configured to: maintain the airbag in a non-inflated state or collapsed state so that the airbag deflates the airbag layer, when the air conditioner to be controlled does not enter the defrosting mode; and deflate the airbag so that the airbag deflates the airbag layer, when the air conditioner to be controlled exits the defrosting mode.

16. The device according to claim 15, wherein, the air pump is configured to: rotate in a set inflation direction to inflate the airbag, when the air conditioner to be controlled enters the defrosting mode;

stop rotating to maintain the airbag in the non-inflated state or collapsed state, when the air conditioner to be controlled does not enter the defrosting mode; and rotate in a set deflation direction to take air away from the airbag so as to deflate the airbag, when the air conditioner to be controlled exits the defrosting mode.

17. The device according to claim 16, further comprising the control valve, wherein the control valve is mounted at the second opening of the air pipe and configured to control the second opening; when the air conditioner to be controlled enters the defrosting mode and the air pump rotates in the inflation direction, the second opening is closed, so that the air pump inflates the airbag in the case where the second opening is closed;

when the air conditioner to be controlled does not enter the defrosting mode and the air pump does not rotate, the second opening is opened to maintain the airbag in the non-inflated state or collapsed state;

when the air conditioner to be controlled exits the defrosting mode and the air pump rotates in the deflation direction, the second opening is closed so that the air pump deflates the airbag; and when the air conditioner to be controlled exits the defrosting mode and the air pump stops rotating, the second opening is opened to deflate the airbag through the second opening under the pressure of the outside flowing air.

18. The device according to claim 16, wherein, a number of the airbag is more than one;

a number of branches is matched with the number of the airbags, and each of the branches is communicated with an opening end of each of the airbags;

a wall of the each of the airbags comprises an elastic layer made of an elastic material, wherein the elastic material comprises natural latex;

the deflation direction comprises a direction opposite to the inflation direction;

an air pressure at the air exhaust end of the air pump is greater than a sum of a contraction force of the each of the airbags and a wind pressure applied to outer surfaces of each of the airbags; and the control valve comprises an air exhaust valve, and the air exhaust valve comprises at least one of a solenoid valve and a pneumatic valve, wherein the solenoid valve comprises a normally-open solenoid valve.

19. The device according to claim 17, wherein, a number of the airbag is more than one;

a number of branches is matched with the number of the airbags, and each of the branches is communicated with an opening end of each of the airbags;

a wall of the each of the airbags comprises an elastic layer made of an elastic material, wherein the elastic material comprises natural latex;

the deflation direction comprises a direction opposite to the inflation direction;

an air pressure at the air exhaust end of the air pump is greater than a sum of a contraction force of the each of the airbags and a wind pressure applied to outer surfaces of each of the airbags; and the control valve comprises an air exhaust valve, and the air exhaust valve comprises at least one of a solenoid valve and a pneumatic valve, wherein the solenoid valve comprises a normally-open solenoid valve.

\* \* \* \* \*